25823

Sept. 4, 1962     C. W. CLARK, JR     3,052,103

MOBILE DISPENSING FREEZER

Filed Sept. 19, 1960     2 Sheets-Sheet 1

INVENTOR.
CHARLES WILLIAM CLARK JR.

BY

ATTORNEYS

Sept. 4, 1962

C. W. CLARK, JR 3,052,103

MOBILE DISPENSING FREEZER

Filed Sept. 19, 1960

INVENTOR.
CHARLES WILLIAM CLARK JR.
BY

ATTORNEYS

United States Patent Office 3,052,103
Patented Sept. 4, 1962

1

3,052,103
MOBILE DISPENSING FREEZER
Charles William Clark, Jr., Edmonds, Wash., assignor to Sweden Freezer Manufacturing Co., Seattle, Wash., a corporation of Washington
Filed Sept. 19, 1960, Ser. No. 56,832
12 Claims. (Cl. 62—208)

This invention relates to a self-sufficient freezing and mechanical drive system for use on an automotive truck, and particularly in conjunction with a dispensing freezer to permit frozen confections to be dispensed directly to buyers in the street. In a dispensing freezer of the character to which the present invention pertains, only a given quantity of the confection is frozen at the intiation of a day's run and it is usual to replenish this with unfrozen mix as successive servings of the frozen confection are dispensed. Dashers are provided in the freezer so as to whip air into the mix as the same is being frozen and otherwise give to the confection a proper and uniform consistency. In the past, the compressor and dasher for the dispensing freezer used in a mobile unit have been driven by electric motors in the same manner as for stationary mounted freezers, and hence it has been necessary to also install a generator set to provide the required electric power.

Accordingly, the present invention aims to provide a simplified drive arrangement whereby the compressor in a refrigeration system on a mobile unit, can be efficiently driven by an internal combustion engine rather than by an electric motor.

A further object is to provide an improved refrigeration and dasher drive system for a dispensing freezer which will not require the use of electric motors.

Still another object is to provide a particularly efficient system for meeting the needs of two refrigeration loads with a single compressor.

With yet additional objects and advantages in view which, with the foregoing, will appear and be understood in the course of the following description and claims, the invention consists in the novel construction and in the adaptation and combination of parts hereinafter described and claimed.

Figure 1:
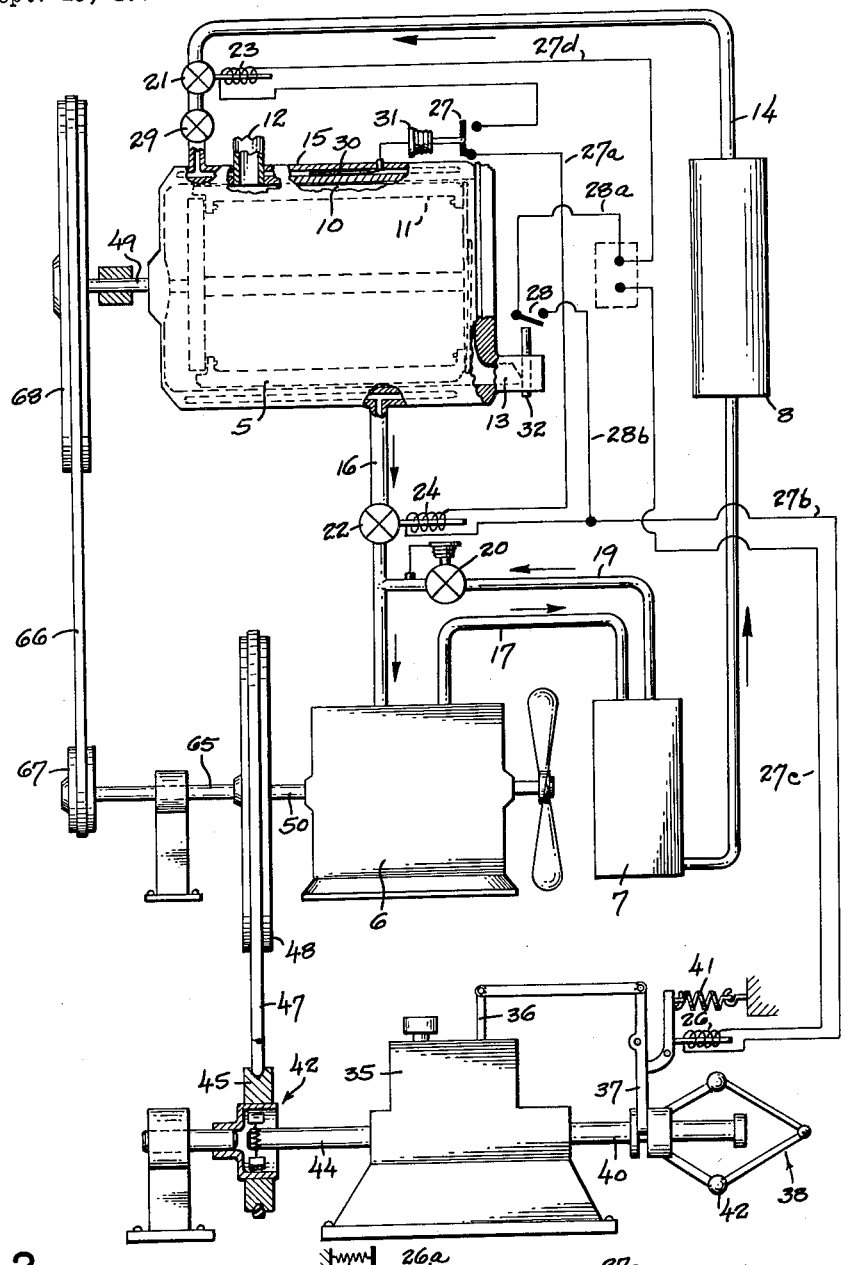
FIGURE 1 is a diagrammatic illustration of a self-sufficient freezing and dasher drive arrangement for a dispensing freezer and embodying teachings of the present invention.

The system of the present invention provides a freezing circuit comprised of a dispensing freezer 5, a compressor 6, and a condenser 7, and a liquid receiver 8. Within the freezing cylinder 10 of the freezer there is provided a dasher 11 having as its functions (1) to stir the mix which is charged through a feed pipe 12 and (2) to urge the frozen contents toward the discharge gate of a dispensing head 13. Liquid refrigerant is supplied by a pipe 14 from the receiver 8 to a jacket 15 of the freezer surrounding the freezing cylinder, and gas refrigerant returns by a pipe 16 from said jacket to the compressor 6. At the entry of the jacket 15 an expansion valve 29 is provided. Respective pipes 17 and 18 lead from the compressor to the condenser 7, and from the condenser to the liquid receiver. The refrigerant circuit is completed by a by-pass line 19 connecting the condenser directly with the compressor. Normally closing this by-pass line is a valve 20 opened automatically as the pressure at the

2 suction side of the compressor lowers to a predetermined level.

Also provided in the pipe 14 and the pipe 16, are normally closed valves 21 and 22, respectively, opened by the energizing of solenoids 23 and 24. These solenoids are contained together with an electrical supply source 25 and a third solenoid 26 in a normally incomplete series electric circuit 27a–d closed by a normally open switch 27. The latter is closed automatically as the temperature condition of the refrigerant within the jacket 15 rises above the upper of two low-temperature levels and it opens automatically as such temperature condition falls below the lower of said levels. For this purpose there is provided one or more thermostats 30 acting on a pressure-responsive diaphragm 31.

A second normally open electric circuit consisting of leads 27b, 28a, 28b, and part of lead 27c is provided for solenoid 26. This second circuit is controlled by a switch 28 which is closed automatically or by hand, in either case being performed in conjunction with the opening of a control plunger or gate 32 for the dispensing head. Refrigeration systems embodying structure like or similar to that of the above-described system are disclosed in the following United States patents: Nos. 2,604,307, 2,687,019, 2,698,163, 2,737,024, 2,746,260, 2,746,640 and 2,746,730.

Proceeding with a description of the first of the present advancements 35 designates an internal combustion engine having its throttle arm 36 linked to a lever 37 which is connected to a governor 38 fitted on an engine-driven spindle 40. A spring 41 acts counter to the centrifugal throw of the governor balls 42 and normally holds the r.p.m. of the engine at idling speed. The afore-mentioned solenoid 26 when energized, counters the spring 41 and causes such a greater throw of the governor balls as to increase the engine r.p.m. to a predetermined upper speed level.

A normally disengaged clutch 42 of the centrifugal type connects the power shaft 44 of the engine with a pulley 45 from which a drive belt 47 gives a driving connection to a complementing pulley 48 mounted on a drive shaft 50 for the compressor, thus giving a reduction drive from the engine to the compressor. Pulley 48 also drives a stub shaft 65 and reduction from the latter to a drive shaft 49 for the dasher 11 is effected by a belt 66 trained about pulleys 67—68. Drive shoes within the clutch 42 contracted by spring pressure and expanding under influence of centrifugal throw, establish a driving couple from the power shaft 44 of the engine to the drum element of the clutch. The contracting values of the clutch springs are such that they become overpowered by the centrifugal force exerted upon the drive shoes when the engine speed is at a predetermined point between the above mentioned idling speed and upper speed level of the engine 35.

From the foregoing it is seen that whenever the switch 28 is closed in conjunction with the act of opening the gate 32 to dispense frozen product from the freezing cylinder 10, the solenoid 26 is responsively energized to overcome the spring 41 so that the governor 38 can take over to increase the engine speed from idling to its upper setting. During this speed increase the clutch 42 automatically engages to drive the dasher 11 so that frozen product will be urged thereby toward the dispensing head 13 for discharge past the open gate 32. Such engagement of the clutch 42 also of course starts the compressor 6. However, if the refrigeration needs of the freezing cylinder have not increased, which will commonly be the case if the freezer does not have an automatic mix feed system, the switch 27 remains opened, and hence the valves 21—22, may remain closed during product dispensing without damaging the refrigeration system because the by-pass valve 20 will automatically open as the pressure at the suction side of the compressor lowers to the predetermined setting.

On the other hand, whenever the temperature condition of the refrigerant within the jacket 15 rises above the upper of its two low-temperature levels, the switch 27 automatically closes causing energizing of the solenoids 23—24 to open valves 21—22 regardless of whether the gate 32 is then open or closed. If the gate 32 is closed, the solenoid 26 will also be energized responsive to closing of the switch 27, thereby causing the engine 35 to speed up and the clutch 42 to engage as before to drive the compressor 6. The dasher 11 will perforce also be driven, but this is desirable to maintain a uniform product consistency and to prevent a frozen product buildup on the inside wall of the freezing cylinder 10.

Figure 2:
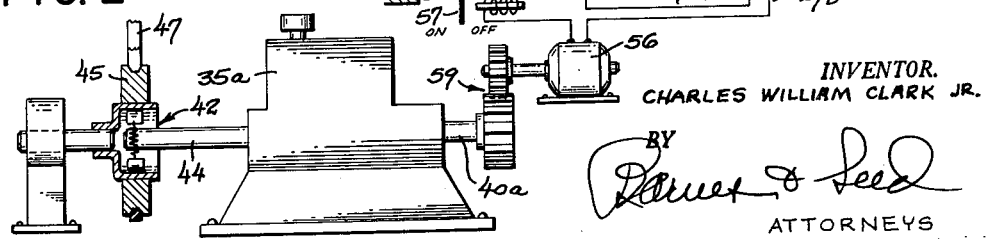
FIG. 2 is a fragmentary diagrammatic illustration of a modified such arrangement.

Referring to FIG. 2, I have illustrated a modified arrangement in which the internal combustion engine, designated 35a, has a governor controlled speed (governor not shown) below which the centrifugal clutch 45 is set to engage for driving the compressor and dasher as before, but in which the engine stops rather than slowing to idling speed when switches 27 and 28 are in their normally open position. In this case the solenoid 26 is replaced in the electric control circuit by a solenoid 26a and a starter-generator 56 which are thus both energized when either of switches 27—28 is closed. The ignition switch 57 for the engine 35a is urged to a normally "off" position by a spring 58 and is turned to the "on" position by the solenoid 26a when it is energized. Operative connection is made between the starter-generator 56 and the engine spindle 40a as by gears 59. Thus whenever the switch 28 is closed together with opening of the gate 32 for dispensing frozen product, or the switch 27 is closed responsive to a refrigeration need in the freezing cylinder, the ignition switch 57 will automatically turn to the "on" position by action of the solenoid 26a and the starter-generator 56 will be energized to turn over the engine. As soon as the engine starts the unit 56 functions as a generator and as the engine speed builds up toward its governed speed the load of the compressor 6 and dasher 11 are automatically applied by engagement of the clutch 42. When the load requirements are satisfied the spring 58 takes over to turn off the engine.

Commonly, the mobile unit will have refrigeration requirements other than the dispensing freezer, as for example a cold storage box for ice cream mix and food products, an air conditioner, or a soda fountain. Accordingly, in FIG. 3 I have shown a further modified system in which such a secondary refrigeration load is identified by numeral 60. The evaporator for this load is supplied with refrigerant through auxiliary line 61 from pipe 14 and discharges at 62 to the suction line 16 of the compressor. The conventional expansion and regulator valves 63—64, respectively, are also provided.

It will be noted that the drive from the engine to the dasher 11 is also modified. Instead of coming from the compressor drive pulley 48 it operates from a second centrifugal clutch 43 which selectively connects the power shaft 44 of the engine with a pulley 46 via clutch 42 and a jack shaft 69. Drive belts 51—52 trained about pulleys 46, 53 and 54—55 compound their reductions in passing power first to a jack shaft 56 and then to a drive shaft 49a for the dasher 11. The engine has two speed settings and the contracting values of the respective springs in the clutches 42—43 are such that the springs of the clutch 42 become overpowered by the centrifugal force exerted upon its drive shoes at an engine speed somewhat lower than the lower of said two speed settings, whereas the springs of the other clutch 43 become overpowered, and the clutch responsively engaged, at a speed somewhere between said settings.

The lower speed setting of the engine, rather than being merely idling speed as before, is made adequate to drive the compressor 6 at an output sufficient to satisfy the refrigeration requirements of the secondary load 60.

Figure 3:
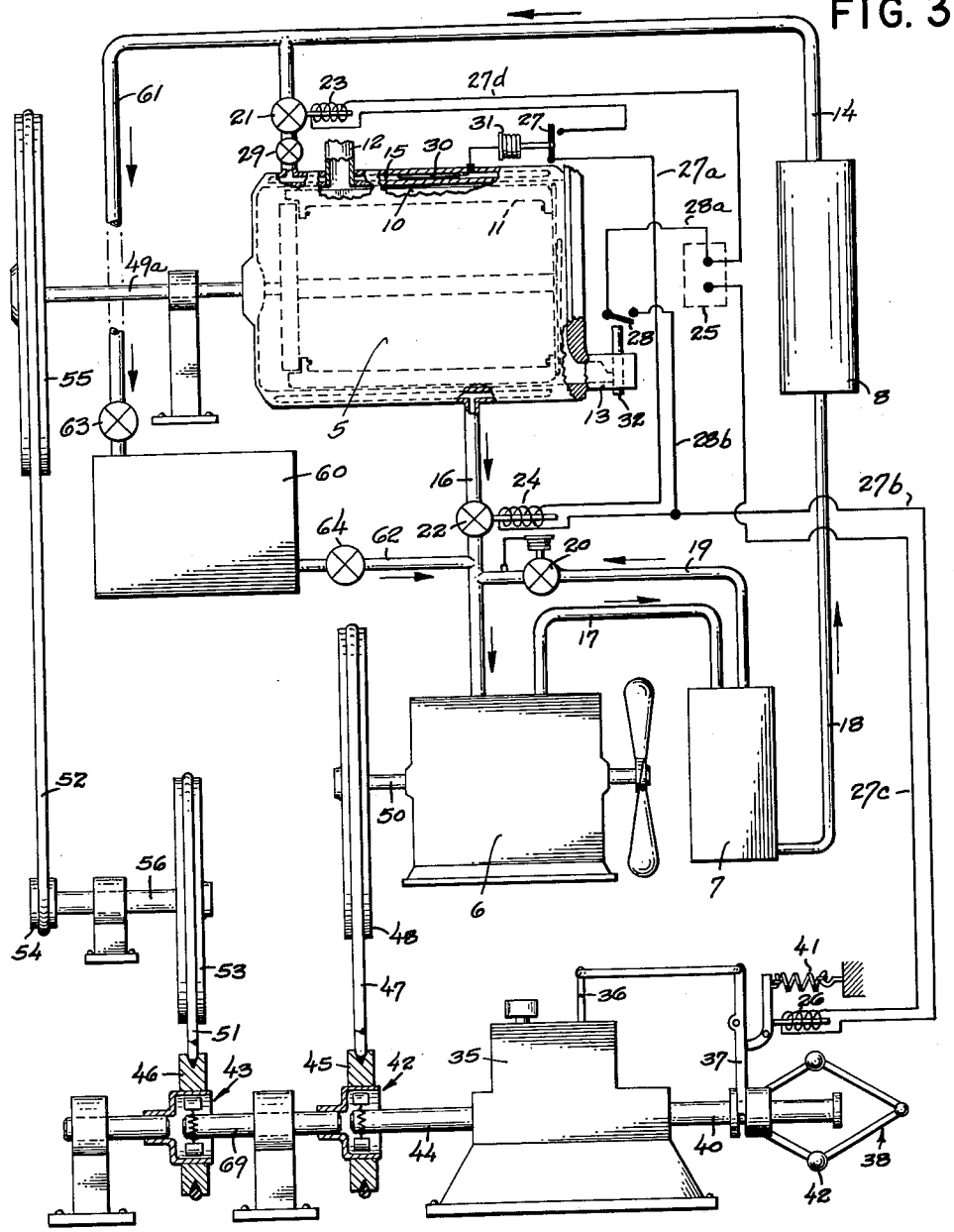
FIG. 3 is a diagrammatic illustration of another modified self-sufficient freezing and dasher drive arrangement for the combination of a dispensing freezer and a secondary refrigeration load.

In other words the compressor is constantly driven in the case of the FIG. 3 system, the purpose of the clutch 42 therein being to permit the engine to be started free of load. If the valve 64 is closed responsive to satisfaction of the refrigerant requirement of the secondary load, and assuming that the valve 22 is also closed, the by-pass valve 20 will then automatically open responsive to the resulting lowering of the pressure at the suction side of the compressor. The refrigerant will then merely by-pass back to the compressor until the dispensing freezer or secondary load again has a refrigeration need.

Operation of the electrical control circuit in the case of the FIG. 3 system is the same as that in FIG. 1 afore described. When the governor 38 is set into operation to raise the engine speed to the upper of its two settings by activation of the solenoid 26 responsive to closing of switch 27 or 28, the clutch 43 engages during the speed buildup resulting in driving of the dasher 11. At the same time, the speed of the compressor 6 of course also increases thereby giving more output potential in case the dispensing freezer and secondary load have simultaneous refrigeration requirements.

It is believed that the invention will have been clearly understood from the foregoing description of my now preferred illustrated embodiments. Changes in the details of construction may be resorted to without departing from the spirit of the invention, wherefore it is my intention that no limitations be implied and that the hereto annexed claims be given a scope fully commensurate with the broadest interpretation to which the employed language fairly admits.

What I claim is:

1. In combination, a dispensing freezer, having a rotary dasher and a discharge gate, a refrigeration system for said freezer including a compressor, and electric control circuit including a solenoid, a normally-open thermal-operated switch operatively associated with said freezer for closing said switch responsive to a given upper freezer temperature limit, and a normally-open switch operatively associated with said gate for closing such switch responsive to an opening of the gate, said solenoid and switches being so arranged that the solenoid is energized responsive to a closing of either of the switches, internal combustion means with a rotary output shaft, speed control means operatively associated with said solenoid and said internal combustion means for setting the speed of said output shaft at a given lower speed above zero speed when said solenoid is deenergized and at a given higher speed when said solenoid is energized, power transfer means from said output shaft to said compressor, and power transfer means from said output shaft to said dasher and including a normally disengaged clutch which automatically engages responsive to an output shaft speed higher than said lower speed.

2. In combination, a dispensing freezer having a rotary dasher and a normally closed discharge gate, a second refrigeration load, a refrigeration system for said freezer and second load including a compressor, an internal combustion engine operatively connected with said compressor and having a preset lower output speed level above zero speed adequate for said compressor to meet at least the refrigeration requirement of said second refrigeration load, power transfer means from said engine to said dasher and including a normally disengaged clutch which automatically engages responsive to an engine speed higher than said preset lower speed, and speed control means operatively associated with said engine and with the temperature condition of said freezer for automatically raising the output speed of said engine to a predetermined upper level, to thereby engage said clutch to drive said dasher and give an increased compressor output, when said temperature reaches a predetermined upper level and for automatically lowering the engine speed to said preset lower level when said temperature condition lowers to a predetermined lower level, said refrigeration system including refrigerant control means for preventing the flow of refrigerant to said freezer when said engine is at said lower output speed level.

3. The structure of claim 1 in which said refrigeration system includes a condenser and a by-pass line from said condenser to the suction side of said compressor having a normally closed valve which opens automatically when the pressure at said suction side lowers to a predetermined level.

4. The structure of claim 1 in which said refrigeration control means comprises a normally closed valve at the refrigeration inlet side of said freezer which is operatively associated with said speed control means to open whenever said output speed of the engine is raised responsive to raising of the said freezer temperature condition to said predetermined upper level.

5. The structure of claim 4 in which said refrigerant control means also includes a normally closed valve at the refrigeration outlet side of said freezer which is operatively associated with said speed control means to open with said normally closed valve at the refrigeration inlet side of said freezer.

6. The structure of claim 3 in which said refrigeration control means comprises a normally closed valve at the refrigeration inlet and outlet sides of said freezer which are operatively associated with said speed control means to open whenever said output speed of the engine is raised responsive to raising of said freezer temperature condition to said predetermined upper level.

7. The structure of claim 2 in which said speed control means has a normally-open electric control circuit which includes two parallel branches, one branch having a normally open switch arranged to be closed responsive to an opening of said discharge gate, and the second said branch having a normally closed switch with means for opening it responsive to a raising of said temperature condition of the freezer to said predetermined upper level.

8. The structure of claim 7 in which said refrigeration control means comprises a normally closed solenoid valve at the refrigeration inlet side of said freezer having its solenoid in said second branch of the electric control circuit.

9. The structure of claim 7 in which said refrigeration control means comprises normally closed solenoid valves at the refrigeration inlet and outlet sides of said freezer having their solenoids in said second branch of the electric control circuit.

10. In combination, a dispensing freezer having a rotary dasher and a normally closed discharge gate, a second refrigeration load, a refrigeration system for said freezer and second load including a compressor, an internal combustion engine operatively connected with said compressor and having a preset lower output speed level above zero speed adequate for said compressor to meet at least the refrigeration requirement of said second refrigeration load, power transfer means from said engine to said dasher and including a normally disengaged clutch which automatically engages responsive to an engine speed higher than said preset lower speed, and speed control means operatively associated with said engine and including a normally-open electric control circuit for automatically raising the output speed of said engine to thereby engage said clutch when said control circuit is closed, said refrigeration system including normally closed solenoid valves at the refrigeration inlet and outlet sides of said freezer, and said electric control circuit having two parallel branches, one branch having a normally open switch arranged to be closed responsive to an opening of said discharge gate, and the other said branch having the solenoids of said solenoid valves and a normally closed switch with means operatively associated with said freezer for opening the latter said switch responsive to a raising of the temperature condition of said freezer to a predetermined upper level and for closing said switch when said temperature condition lowers to a predetermined lower level.

11. The structure of claim 1 in which said refrigeration system includes normally closed solenoid valves at the refrigeration inlet and outlet sides of said freezer whose solenoids are so arranged in said electric control circuit that they are closed responsive to a closing of said thermal-operated switch.

12. The structure of claim 11 in which said refrigeration system includes a condenser and a by-pass line from said condenser to the suction side of said compressor having a normally closed valve which opens automatically when the pressure at said suction side lowers to a predetermined level.

References Cited in the file of this patent

UNITED STATES PATENTS

| Number | Name | Date |
|---|---|---|
| 2,209,979 | Johnson | Aug. 6, 1940 |
| 2,446,156 | Kolz | July 27, 1948 |
| 2,527,790 | Borgerd | Oct. 31, 1950 |
| 2,559,032 | Tacchella | July 3, 1951 |
| 2,737,024 | Swenson | Mar. 6, 1956 |
| 2,752,760 | Kaufman | July 3, 1956 |
| 2,889,691 | Schjolin | June 9, 1959 |
| 2,931,348 | Carraway | Apr. 5, 1960 |
| 2,962,873 | Anderson | Dec. 6, 1960 |